US008665773B2

(12) United States Patent
Bhat (10) Patent No.: US 8,665,773 B2
(45) Date of Patent: Mar. 4, 2014

(54) CHANNEL QUALITY MEASUREMENT IN RELAY SYSTEMS

(75) Inventor: Prakash Bhat, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 12/998,091

(22) PCT Filed: Sep. 17, 2009

(86) PCT No.: PCT/GB2009/051210
§ 371 (c)(1),
(2), (4) Date: Apr. 25, 2011

(87) PCT Pub. No.: WO2010/032053
PCT Pub. Date: Mar. 25, 2010

(65) Prior Publication Data
US 2011/0211467 A1    Sep. 1, 2011

(30) Foreign Application Priority Data

Sep. 17, 2008  (GB) .................................... 0816992.2

(51) Int. Cl.
*H04B 7/14*  (2006.01)
*H04W 4/00*  (2009.01)
*H04J 1/10*  (2006.01)

(52) U.S. Cl.
USPC ............................ 370/315; 370/332; 370/492

(58) Field of Classification Search
USPC .................. 370/315–317, 332, 492
See application file for complete search history.

(56) References Cited

U.S. PATENT DOCUMENTS

| 2006/0187852 | A1 | 8/2006 | Kwon et al. |
| 2007/0153758 | A1* | 7/2007 | Kang et al. .................... 370/338 |
| 2007/0237107 | A1* | 10/2007 | Jang et al. ..................... 370/315 |
| 2008/0080436 | A1* | 4/2008 | Sandhu et al. ................ 370/338 |
| 2008/0227461 | A1* | 9/2008 | Dayal et al. ................ 455/452.2 |
| 2008/0232395 | A1* | 9/2008 | Buckley et al. ............... 370/465 |
| 2009/0047898 | A1* | 2/2009 | Imamura et al. ................. 455/7 |
| 2009/0060010 | A1* | 3/2009 | Maheshwari et al. ........ 375/211 |
| 2009/0191882 | A1* | 7/2009 | Kovacs et al. ................. 455/450 |
| 2009/0196177 | A1* | 8/2009 | Teyeb et al. ................... 370/231 |
| 2009/0203309 | A1* | 8/2009 | Okuda .............................. 455/7 |
| 2009/0252079 | A1* | 10/2009 | Zhang et al. .................. 370/315 |
| 2010/0034135 | A1* | 2/2010 | Kim et al. ...................... 370/315 |
| 2011/0103338 | A1* | 5/2011 | Astely et al. .................. 370/329 |

OTHER PUBLICATIONS

3GPP TR 36.913 V8.0.0 (Jun. 2008), $3^{rd}$ Generation Partnership Project; Technical Specification Group Radio Access Network; Requirements for Further Advancements for E-UTRA (LTE-Advanced) (Release 8), 14 pp.

* cited by examiner

*Primary Examiner* — Noel Beharry
*Assistant Examiner* — Joe Combs
(74) *Attorney, Agent, or Firm* — Muirhead and Saturnelli, LLC (57) ABSTRACT

An SAE/LTE or 4G cellular telecommunications network is disclosed which comprises a plurality of eNodeBs and a network core. A plurality of mobile telecommunications devices are registered with the network and communicate with the network core via the eNodeBs. A relay is provided between the eNodeB 5 and the mobile telecommunications device to extend the radio coverage provided by the eNodeB. Channel quality measurement data are transmitted to at least one of the telecommunications devices in a link with the relay to enable the telecommunications devices to calculate the channel quality between the mobile device and the relay and/or the node.

12 Claims, 10 Drawing Sheets

CHANNEL QUALITY MEASUREMENT IN RELAY SYSTEMS

BACKGROUND TO THE INVENTION

This application relates to telecommunications networks, and more particularly, but not exclusively, to developments in such networks suitable for adoption in 3GPP SAE/LTE or 4th generation (4G) mobile or cellular telecommunications networks that will be implemented in the future.

It is anticipated that SAE/LTE and 4G networks may provide the following advantages, compared to these known networks:
1. Support interactive multimedia services: teleconferencing, wireless Internet, etc.
2. Wider bandwidths, higher bit rates.
3. Global mobility and service portability.
4. Scalability of mobile networks.

and may be/have:
5. Entirely packet-switched networks.
6. All network elements are digital.
7. Higher bandwidths to provide multimedia services at lower cost.
8. Tight network security.

In order to improve the coverage provided by an LTE node (eNodeB) one or more relays may be used to provide additional cells. For example, a relay may receive wirelessly downlink data from an eNodeB that is destined for a particular mobile device. The relay then passes that downlink data to the mobile device. This is advantageous in the event that the mobile device is not in the radio coverage area of the eNodeB. The relay enables the mobile device to receive data even when the mobile device is not in the radio coverage area of the eNodeB. Similarly, a relay enables uplink data to be transmitted from a mobile device to an eNodeB. It would be desirable to enable a mobile device to determine the quality of the link with the relay.

BRIEF SUMMARY OF THE INVENTION

According to a first aspect of the system described herein, there is provided a method of operating a mobile telecommunications network including a plurality of nodes and a network core, wherein a plurality of mobile telecommunications devices are registered with the network and communicate with the network core via the nodes, and wherein at least one of relay is provided between at least one of the nodes and at least one of the telecommunications devices to extend the radio coverage provided by the said node, characterised by transmitting channel quality measurement data to said at least one of the telecommunications devices in a link with the relay to enable the telecommunications device to calculate at least one of (a) the channel quality between the mobile device and the relay, and (b) the channel quality between the device and the node.

In the embodiments the channel quality measurements are transmitted in a predetermined part of a data frame.

The channel quality measurement data may include respective portions, a first of which enables the telecommunications device to calculate the channel quality between the telecommunications device and the relay, and a second of which enables the telecommunications device to calculate the channel quality between the telecommunications device and the node, the first and second portions of the channel quality measurement data being in different predetermined parts of the data frame.

The or each predetermined part of the data frame may be a predetermined time and frequency—for example, a particular resource element or a resource block of a slot of a sub-frame of an LTE OFDMA radio frame.

In the embodiments, during transmission of the data frame, data are transmitted by the relay that enables the mobile terminal to calculate the channel quality between the mobile terminal and the relay, and data are transmitted by the node that enables the device to calculate the channel quality between the device and the node. These transmissions may be superimposed but in such a way that the data transmitted by the relay and the data transmitted by the node are interpretable by the device.

In one embodiment the channel quality measurement data is made available to only selected ones of the telecommunications devices by transmitting the channel quality measurement data in a data frame format that other ones of the telecommunications devices ignore. For example, the other ones of the telecommunications devices may be devices that are incapable of linking to relays, and therefore would have no requirement to receive data in a link from the relay (indeed, receiving such data may impair the performance of the telecommunications device). Preferably, the data frame format is one which can be recognised by the other ones of the telecommunications devices as being data frame format that should be ignored. In the embodiment, the data frame format is an LTE MBSFN sub-frame. The data frame may be transmitted in a frequency band usually reserved for transmissions from the node or relay to the device (the downlink frequency band in the embodiment). However, some of the data in the data frame is received in the uplink direction (by the node), and some of the data is received in the downlink direction (by the device).

In the embodiments, the mobile telecommunications network is an LTE mobile telecommunications network. However, the system described herein is applicable to other types of telecommunications networks in which relays are used to extend the radio coverage provided by nodes of that network.

The system described herein also provides a mobile telecommunications network as defined in the claims.

BRIEF DESCRIPTION OF THE DRAWINGS

Embodiments of the system described herein will now be described explained by way of example with reference to the accompanying drawings in which.

In the drawings like elements are generally designated with the same reference sign.

DETAILED DESCRIPTION OF VARIOUS EMBODIMENTS

Overview of SAE/LTE Network

Figure 1:
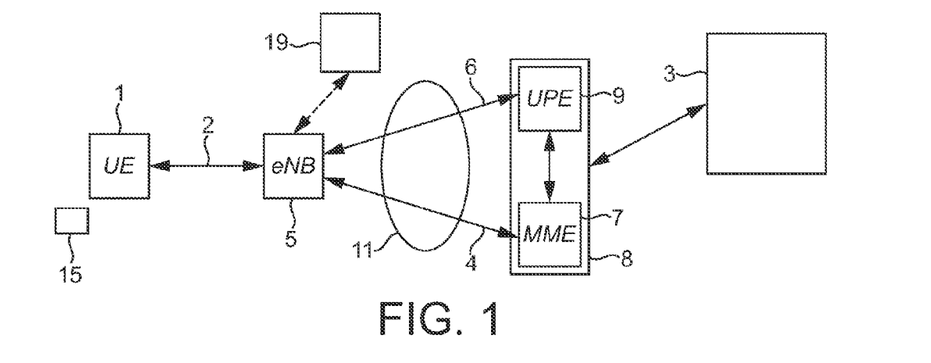
FIG. 1 shows the elements of an SAE/LTE 4G network.

FIG. 1 shows schematically the logical elements of a SAE/LTE cellular telecommunications network. Mobile terminal (UE) 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises an eNodeB (or eNB) 5. An eNodeB 5 performs functions generally similar to those performed by the NodeB and the radio network controller (RNC) of a 3G network. In practice there will be a multiplicity of eNodeBs 5, each serving a particular area or "cells". Each eNode B is coupled to an antenna device 19. The eNode B and antenna device 19 form a cell site. The cell site provides radio coverage to a plurality of cells, e.g. three. Typically, the cell site will only provide radio coverage for a portion of each of the cells. Other portions of each of the cells are provided with radio coverage and by other cell sites.

Signalling in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

A mobility management entity (MME) 7 provides equivalent functions to the control plane functions of the SGSN and GGSN from the 3G architecture (Release-6). The MME handles security key management. The MME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3G RNC and the user plane part of the 3G GGSN. Communications between the eNodeB 5 are transmitted to the UPE 7 via the S1-u Interface 6. The known 3GPP authentication procedure may be re-used in the SAE/LTE architecture shown, between the terminal 1/UE and the MME 7.

It should be noted that, although in FIG. 1 the MME 7 and UPE 9 are shown as separate logical entities they may exist as a single physical node of the telecommunications network in gateway aGW 8.

Data are transmitted between the eNodeB 5 and the MME 7 and UPE 9 via IP transport network 11.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated by a SIM 15.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

According to the LTE Specifications, an eNodeB may be provided with a multiple-input multiple-output (MIMO) system with up to four transmit antennae per eNodeB. Similarly, LTE mobile terminals may be provided with up to four receive antennae.

Data are transmitted in the downlink -DL- (i.e. in the direction from eNodeB to mobile terminal) by orthogonal frequency division multiple access (OFDMA). According to OFDMA the available frequency spectrum is divided into several sub-carriers. To maximise spectral efficiency, the frequency responses of the sub-carriers are overlapping and orthogonal. The OFDMA downlink transmissions and the uplink -UL- transmissions (i.e. transmission from a mobile terminal to an eNodeB) are organised into frames of 10 ms duration. This frame structure is applicable to frequency division duplex (FDD)—the use of frequency-division multiplexing to separate outward and return signals—and time division duplex (TDD)—the use of time-division multiplexing to separate outward and return signals.

Figure 2:
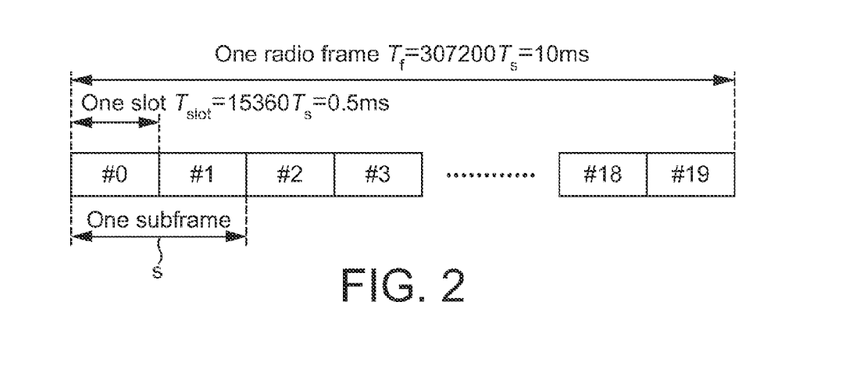
FIG. 2 shows the structure of an LTE FDD frame structure (Type 1)

As shown in FIG. 2, each frame consists of 20 slots (#0, #1 . . . , #19) of 0.5 ms. A sub-frame S is defined as two consecutive slots. For FDD, for a particular frame, 10 sub-frames are available for downlink transmission and 10 sub-frames are available for uplink transmission. The uplink and downlink transmissions are separated in the frequency domain. For TDD, a sub-frame is either allocated to downlink or uplink transmission. However, the first and sixth sub-frame are always allocated for downlink transmission.

Figure 3:
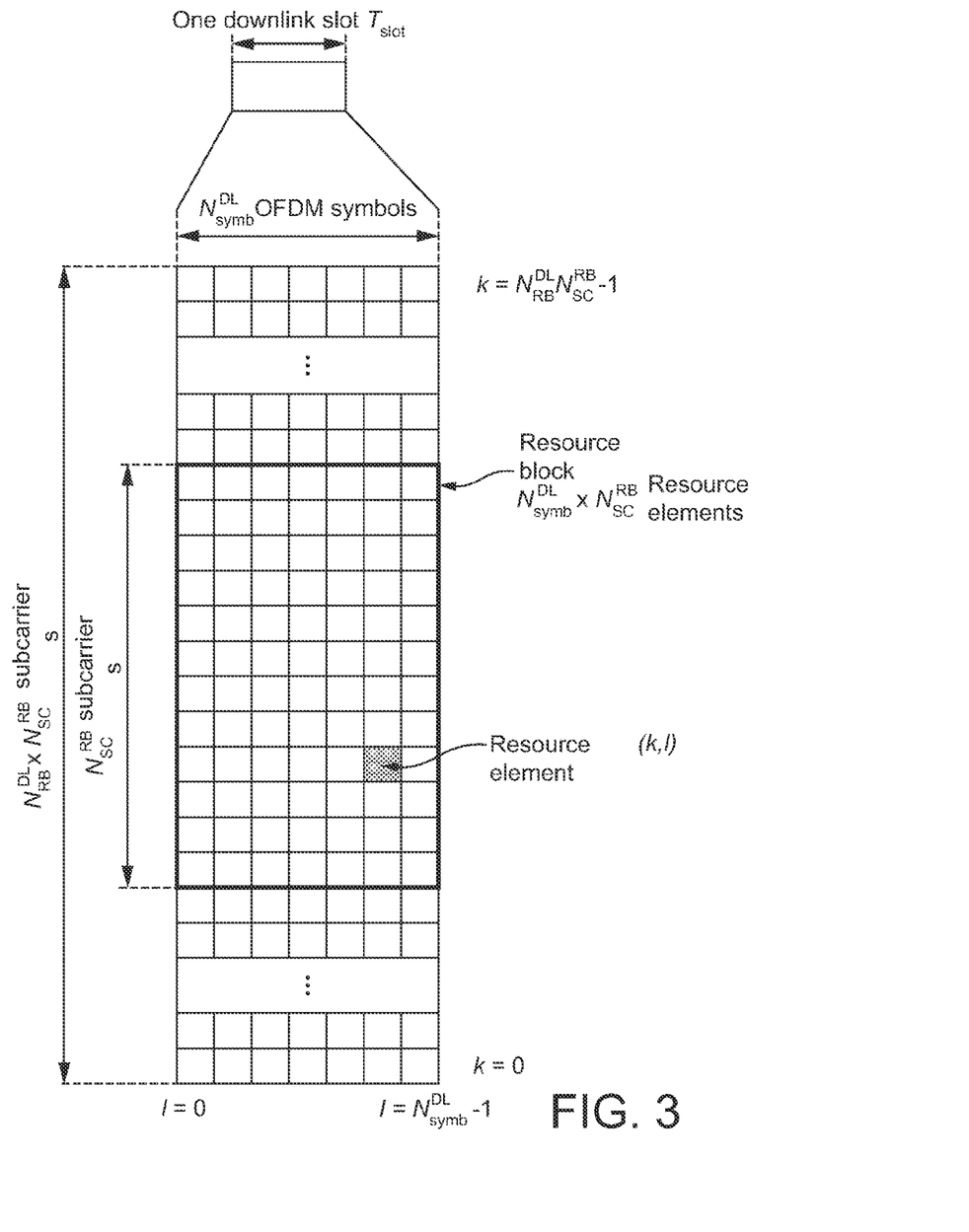
FIG. 3 shows in detail the structure of a downlink slot in LTE for normal cyclic prefix.

As shown in FIG. 3, the FDD downlink signal of each slot can be defined by a resource grid of a predetermined number of sub-carriers (according to the bandwidth available) and a predetermined number of OFDMA symbols. For MIMO transmission there is one resource grid per antenna port. There are twelve consecutive sub-carriers in the frequency domain in FIG. 3.

Data is allocated to UEs in resource blocks, which in FIG. 3 consist of 12 consecutive sub-carriers in the frequency domain and 7 consecutive OFDM symbols. A resource block consists of 12×7 resource elements.

Each eNodeB transmits a reference signal (RS) in the downlink for each antenna port that is unique within that particular cell, and therefore allows the cell to be identified and which are used by the mobile terminals for channel estimation and physical measurements (such as signal strength and signal to noise ratio, average path loss and signal-to-interference ratio) collectively referred to herein as channel quality. The channel quality information is used, for example, to make handover and cell reselection decisions. In LTE the downlink reference signal is modulated into reference signals embedded within the resource blocks.

The measurements represented in the resource blocks are transmitted in the uplink back to the eNodeBs from the mobile terminals.

Figure 4:
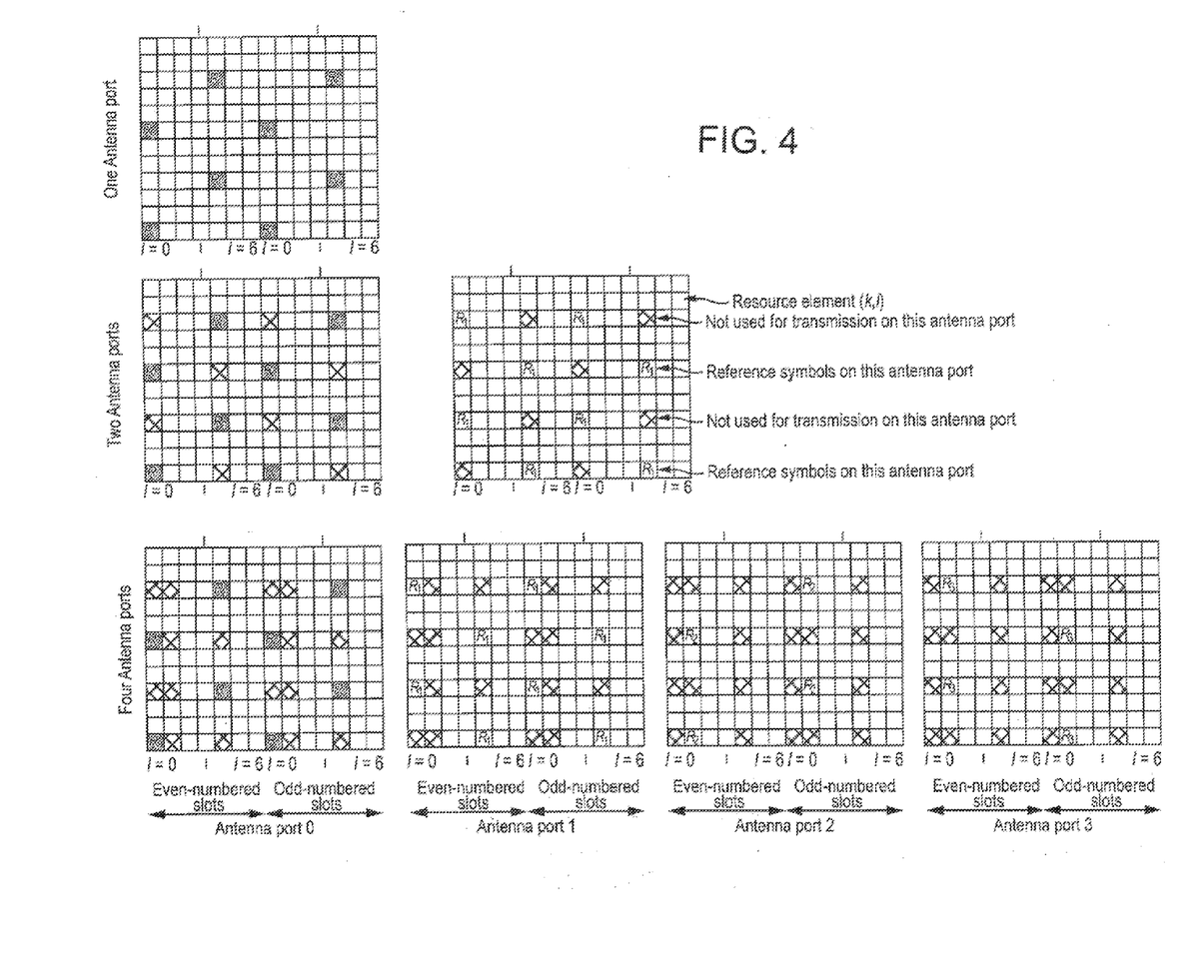
FIG. 4 shows the resource element mapping of reference signals in LTE for a MIMO antenna.

FIG. 4 shows how reference signals are embedded within the two slots of a subframe. In FIG. 4 the reference signals of the first antenna port are designated $R_0$, the reference signals of the second antenna port are designated $R_1$, the reference signals of the third antenna port are designated $R_2$ and the reference signals of the fourth antenna port are designated $R_3$. $R_0$, $R_1$, $R_2$ and $R_3$ are transmitted in each normal sub-frame of the radio frame, depending on the number of cell specific antenna ports over the entire frequency band. It will be appreciated that the inclusion of reference signals within the resource block reduces the amount of data that can be transmitted. This overhead increases with number of antennas. On the other hand, reducing the number of reference signals reduces the channel estimation accuracy. The reference signals for $R_2$ and $R_3$ are not transmitted as frequently as reference signals for $R_0$ and $R_1$ in a subframe to reduce the overhead, and it is therefore more difficult to track fast channel variations. However, four antennas are used for low-mobility terminals only, anyway.

The reference signals are transmitted on equally spaced subcarriers within the first, second and fifth (third from-last) OFDM symbol of each slot in a cell with 4 antenna ports. The UE must get an accurate Carrier to Interference Ratio (CIR) from each transmitting antenna. Therefore, when a reference signals is transmitted from one antenna port, the other antenna ports in the cell are idle. It should be noted that every symbol containing a reference signal also contains control/user data in other resource elements not occupied by the reference signal.

The sub-frames described above are referred to as "normal" subframes to distinguish from MBSFN substances.

Multi-Media Broadcast over a Single Frequency Network (MBSFN) is discussed in Rel-8 of the 3GPP Specifications (which are incorporated herein by reference). MBSFN is envisaged for delivering services such as Mobile TV using the LTE infrastructure. In MBSFN, the transmission happens from a time-synchronized set of eNodeBs using the same resource block. This enables over-the-air combining, thus improving the Signal-to-interference plus Noise-Ratio (SIKNR) significantly, compared to non-SFN operation. LTE Rel-8 UEs are able to distinguish MBSFN sub-frames from normal sub-frames. The MBSFN sub-frame includes reference signals transmitted on equally spaced subcarriers within the first and possibly second OFDM symbol (in case of 3 or 4 antenna ports) of each slot in order to allow the UE to get an accurate Carrier to Interference Ratio (CIR) from each transmitting antenna.

Figure 5:
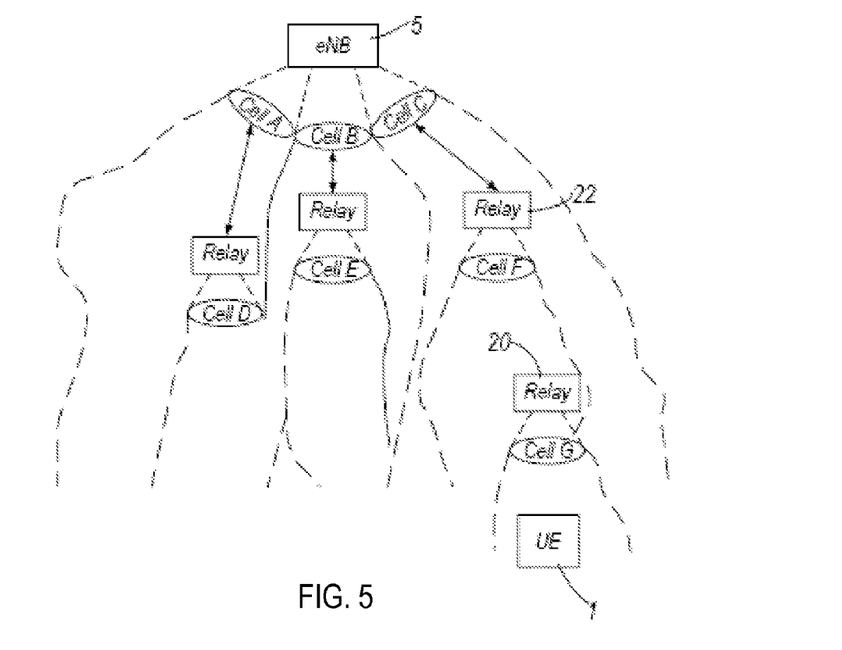
FIG. 5 shows the radio coverage provided by cells of an eNodeB and relays.
Figure 6:
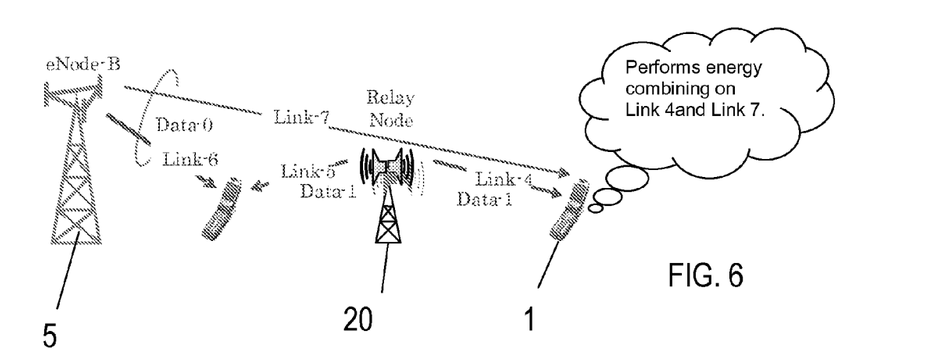
FIG. 6 shows how a UE may perform energy combining of the link with an eNodeB and a relay.

FIG. 5 shows the radio coverage provided by cell A, cell B and cell C of an eNodeB 5. In order to improve the coverage provided by the eNodeB 5 one or more relays may be used to provide additional cells D,E,F and G. To a UE a relay may have the same "appearance" as a cell. However, the relay may have a unique cell ID, different from the cell ID of the eNodeB 5 cell that the relay connects through, and may perform unique system information transmission to the UE. Similarly, the relay may "appear" to the eNodeB 5 as a UE.

Relays connect wirelessly to other relays, eNodeBs and UEs. For example a relay may receive wirelessly downlink data from an eNodeB that is destined for a particular UE. The relay then passes that downlink data to the UE. This is advantageous in the event that the UE is not in the radio coverage area of the eNode B. The relay enables the UE to receive data even when the UE is not in the radio coverage area of the eNodeB. Similarly, a relay enables uplink data to be transmitted from a UE to an eNodeB.

LTE-Advanced is a development of LTE Rel-8 and promises advanced techniques such as the use of Relay's, co-ordinated MIMO techniques, spectrum aggregation etc. There is a requirement in 3GPP TS 36.913 (incorporated herein by reference) for these new features to be backward compatible with LTE Rel-8 UE's, i.e. Rel-8 LTE UE's are to be supported by LTE-Advanced systems.

LTE-Advanced extends LTE Rel-8 with support for relaying as a tool to improve e.g. the coverage of high data rates, group mobility, temporary network deployment, the cell-edge throughput and/or to provide coverage in new areas.

A relay node (RN) is wirelessly connected to a donor cell of a donor eNodeB via the Un interface, and UEs connect to the RN via the Uu interface.

The Un connection can be
  inband, in which case the eNodeB-to-RN link share the same frequency band with direct eNodeB-to-UE links within the donor cell, or
  outband, in which case the eNodeB-to-RN link does not operate in the same frequency band as direct eNodeB-to-UE links within the donor cell.

Two types of inband relays may be used.

A "type 1" relay node is an inband relaying node characterized by the following:
  It controls cells, each of which appears to a UE as a separate cell distinct from the donor cell.

The cells shall have its own Physical Cell ID (defined in LTE Rel-8) and the relay node shall transmit its own synchronization channels, reference signals, etc.

In the context of single-cell operation, the UE receives scheduling information and HARQ feedback directly from the relay node and send its control channels (SR/CQI/ACK) to the relay node.

It appears as a Rel-8 eNodeB to Rel-8 UEs (i.e. it is backwards compatible).

To LTE-Advanced UEs, it is preferable for a type 1 relay node to appear differently to a Rel-8 eNodeB to allow for further performance enhancement.

A "type 2" relay node is an inband relaying node characterized by the following:

It does not have a separate Physical Cell ID and thus does not create any new cells.

It is transparent to Rel-8 UEs; a Rel-8 UE should not be aware of the presence of a type 2 relay node.

Figure 7:
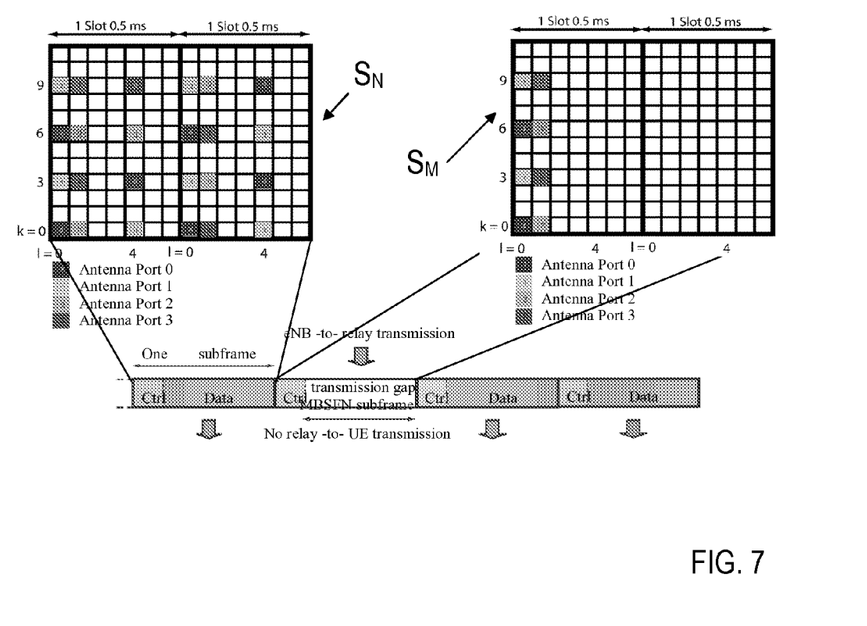
FIG. 7 shows a normal sub-frame and an MBSFN sub-frame which includes reference signals corresponding to eNodeB antennae.

A Rel-8 UE within the Physical Downlink Control Channel (PDCCH) coverage area of the donor eNodeB and within coverage of the relay node:
  receives Rel-8 PDCCH and the Common Reference signal (CRS) only from the eNodeB
  receives Physical Downlink Shared Channel (PDSCH) transmissions facilitated by the relay node When a type 2 relay is used, the UE 1 may perform energy combining of the inbound Un connections from the eNodeB 5 and the relay node 20, as shown in FIG. 7.

On the Uu interface between UE and RN, all control plane (RRC) and user plane (PDCP, RLC and MAC) protocols are terminated in the RN. On the Un interface between RN and eNodeB, the user plane is based on standardised protocols (PDCP, RLC, MAC). The control plane on Un uses RRC (for the RN in its role as UE).

For inband relaying, the eNodeB-to-relay link (the backhand link, Un) operates in the same frequency spectrum as the relay-to-UE link (relay link, Uu). Due to the relay transmitter causing interference to its own receiver, simultaneous eNodeB-to-relay and relay-to-UE transmissions on the same frequency resource may not be feasible unless sufficient isolation of the outgoing and incoming signals is provided. Similarly, at the relay it may not be possible for the relay to receive UE transmissions simultaneously with the relay transmitting to the eNodeB.

In order to allow inband backhauling without this interference of the relay traffic on the relay-eNodeB link, some resources in the time-frequency space are set aside for the backhand link and cannot be used for the access link on each relay node. The following is an example scheme supported for this resource partitioning:

Resource partitioning at the RN:
  in the downlink, eNodeB→RN and RN→UE links are time division multiplexed in a single frequency band (only one is active at any time)
  in the uplink, UE→RN and RN→eNodeB links are time division multiplexed in a single frequency band (only one is active at any time)
Multiplexing of backhaul links in FDD:
  eNodeB→RN transmissions are done in the DL frequency band
  RN→eNodeB transmissions are done in the UL frequency band
Multiplexing of backhaul links in TDD:
  eNodeB→RN transmissions are done in the DL sub-frames of the eNodeB and RN
  RN→eNodeB transmissions are done in the UL sub-frames of the eNodeB and RN As indicated above, one way to handle the interference problem and to provide the time division multiplexing is to operate the relay such that the relay is not transmitting to terminals when it is supposed to receive data from the donor eNodeB, i.e. to create "gaps" in the relay-to-UE transmission. These "gaps" during which terminals (including Rel-8 terminals) are not supposed to expect any relay transmission can be created by configuring MBSFN sub-frames as exemplified in FIG. 7. In FIG. 7 a normal subframe $S_N$ is transmitted, followed by an MBSFN subframe $S_M$. Relay-to-eNodeB transmissions can be facilitated by not allowing any terminal-to-relay transmissions in some sub-frames.

The reference signals are also shown in FIG. 7. The normal sub-frame $S_N$ includes the reference signals described in relation to FIG. 4. The reference signals are transmitted on equally spaced subcarriers within the first, second and fifth (third from-last) OFDM symbol of each slot. The MBSFN sub-frame $S_M$ includes reference signals transmitted on equally spaced subcarriers within the first and possibly second OFDM symbol of the first slot. The reference signals in the MBSFN sub-frame $S_M$ provide information about the link quality with the eNodeB. MBSFN subframes are primarily intended for transmission using multimedia broadcast on a single frequency network (MBSFN) using Physical multicast channel (PMCH). CRS present in the MBSFN subframes are used for mobility measurements and may be used for interpolation over subframes for channel estimation. MBSFN operation will require Pilot signals for the PMCH in addition to the cell specific CRS for each of the antenna ports. As a balance of overhead due to additional pilot for PMCH, the CRS transmission in MBSFN subframe is restricted on the first two OFDM symbols of the first slot of the subframe.

Figure 8:
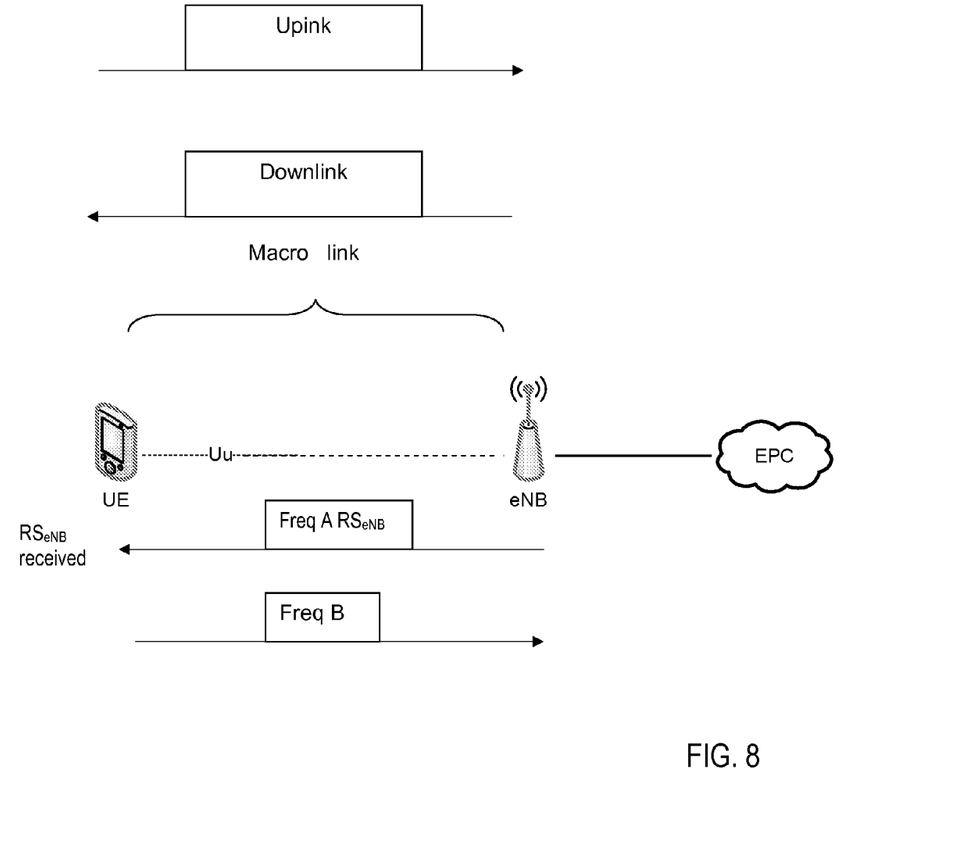
FIG. 8 shows how reference signals for an eNodeB are received by a UE in a sub-frame.

As shown in FIG. 8, for Rel-8 LTE, the eNodeB sends reference signals in every 1 ms sub-frame. An LTE capable UE performs during each sub-frame normal channel estimation, CQI, measurements and mobility measurements based on this cell specific reference signals $RS_{eNB}$ sent by the eNodeB in the DL frequency band A. For LTE, CQI measurement may be on a sub-band basis (only a few sub-frames are used) or entire bandwidth is used. For smaller bandwidths (6-7 resource blocks, RBs) which corresponds to bandwidth's less than 3 MHz, only wideband CQI is reported by the UE. Transmissions from the UL to the eNodeB are sent in the UL frequency band B.

Discussion of Embodiments

What has been explained thus far is conventional. Embodiments of the system described herein now to be described provide for the advantageous implementation of relays.

For Inband-relays, some of the frequency duplexing envisaged for relay deployment are such that the UE would potentially not receive reference signals for the eNodeB in the DL in every sub-frame as the same frequency is time multiplexed between backhaul link and the relay link. For such deployments, legacy Rel-8 LTE UE's will not be able to perform channel quality estimation accurately as the mobile terminal cannot gather sufficient reference signals for accurate reporting. This is more of a problem for smaller bandwidths where the UE will be unable to perform CQI estimation accurately. Further, it is desirable that LTE-Advanced UEs are able to perform CQI estimation for relay nodes as well as eNodeBs.

Figure 9:
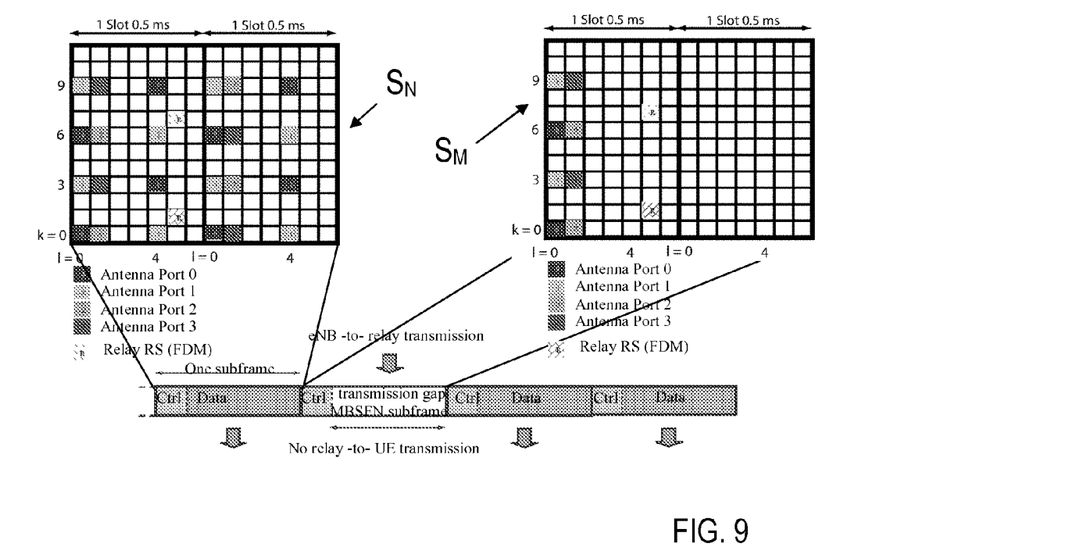
FIG. 9 shows normal sub-frame and an MBSFN sub-frame which are modified to include reference signals corresponding to a relay.

As shown below, there are several possible configurations for relays. The below proposal may allow Rel-8 UEs to always receive a cell specific RS in each sub-frame when two frequency bands are available, and to receive cell specific RS in at least alternate sub-frames when a single frequency is used for accurate channel estimation In accordance with an aspect of the embodiments, in order to convey channel link quality information for the relay, reference signals for the relay are transmitted on equally spaced subcarriers within the sixth (second from-last) OFDM symbol of each slot of the normal sub-frame $S_N$ as an example. The actual position for the relay RS in time (xth symbol) and frequency (yth subcarrier) may be selected for the best channel impulse response from the relay node. It should be noted that the sub-frame $S_N$ is "normal" in the sense that it is not a MBSFN sub-frame; however, the sub-frame differs from a known "normal" sub-frame in that it includes reference signals for the relay. In the current embodiment, as shown in FIG. 9, the MBSFN sub-frame $S_m$ includes reference signals for the relay transmitted on equally spaced subcarriers within the sixth (second from-last) OFDM symbol of the first slot. These reference signals are identifiable by an LTE-Advanced UE by virtue of their position in the sub-frame, and can be used by the UE to calculate channel quality of the relay link.

FIGS. 10A, 10B, 10C and 10D show successive time periods for a type 1 relay in accordance with an embodiment of the system described herein.

Figure 10A:
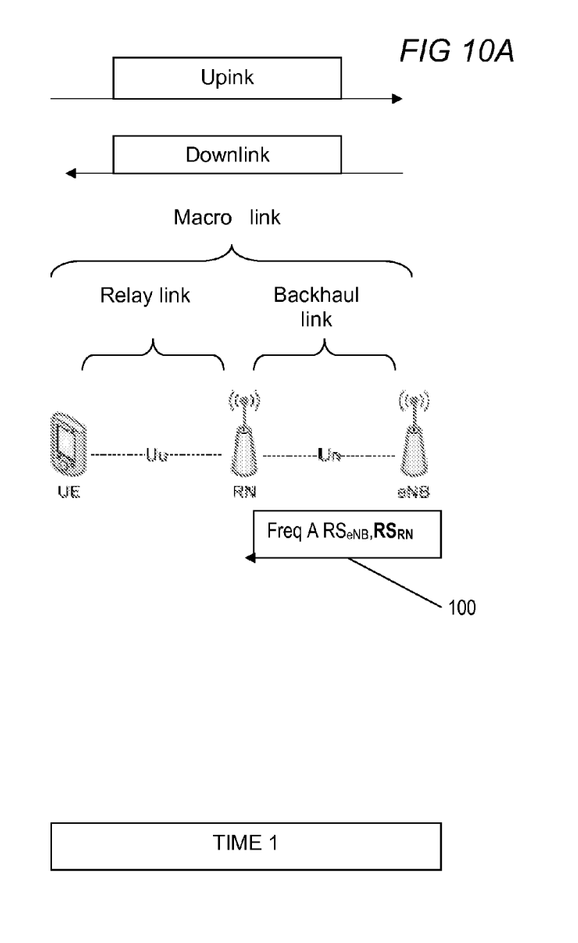
FIGS. 10A, 10B, 10C and 10D show successive time periods of data transmission for a type 1 relay in accordance with an embodiment of the system described herein.

As shown in FIG. 10A, in the first time period TIME 1 an MBSFN sub-frame (Freq A $RS_{eNB}$,$RS_{RN}$) 100 is transmitted from the eNodeB to the RN on the DL frequency band A. This MBSFN sub-frame has the structure as shown in FIG. 9 ($S_M$) and includes reference signals $RS_{eNB}$ for the eNodeB antenna ports in equally spaced subcarriers within the first and second OFDM symbol of the first slot. The reference signals in the MBSFN sub-frame provide information about the channel link quality with the eNodeB. This sub-frame also includes reference signals $RS_{RN}$ for the relay transmitted on equally spaced subcarriers within the sixth (second from-last) OFDM symbol of the first slot of the MBSFN sub-frame. These reference signals provide information about the channel link quality with the RN. If the MBSFN sub-frame (Freq A $RS_{eNB}$ $RS_{RN}$) 100 is also received by the UE 1, the UE 1 will ignore the sub-frame as it will detect that the sub-frame is an MBSFN sub-frame not intended for the UE 1. In this way, the UE 1 accepts a "gap" in transmission from the eNodeB.

Figure 10B:
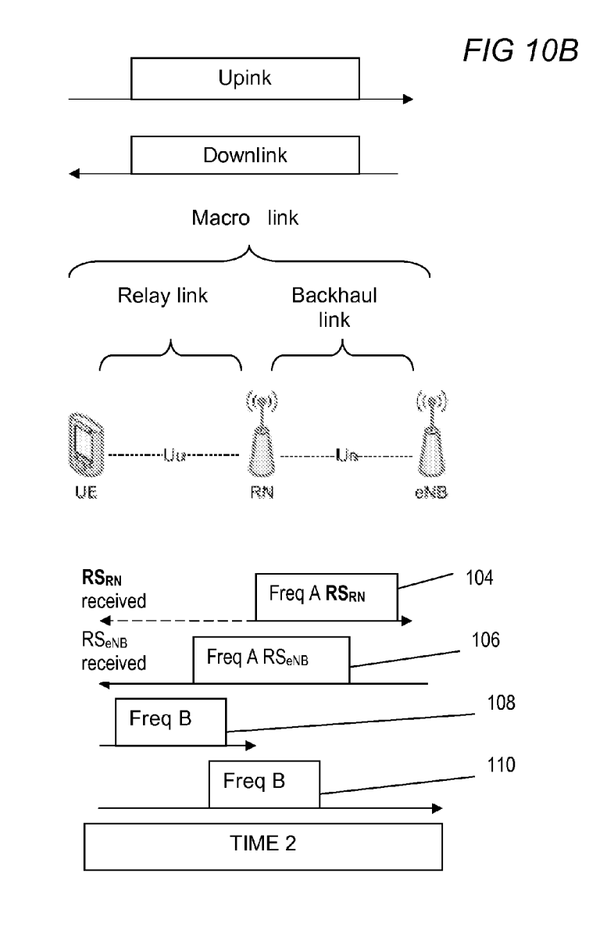

As shown in FIG. 10B, in the second time period TIME 2 an MBSFN sub-frame (Freq A $RS_{RN}$) 104 is transmitted from the RN on the DL frequency band A including only the Relay RS. The eNodeB, in the first two symbols of the MBSFN sub-frame (if there are three or four antenna ports, or only the first symbol if there are one or two antenna ports), sends reference signals for the eNodeB $RS_{eNB}$ and switches to receive mode. The eNodeB is adapted to receive the data present in the third, fourth, fifth, sixth and seventh symbol (if there are only one or two antenna ports, the eNodeB will also receive the second symbol) transmitted by the RN. It should be noted that the sub-frame (Freq A $RS_{RN}$) 104 is partially transmitted in the UL direction but using the DL frequency band A. If the UE is an LTE-Advanced UE, the UE is adapted to receive the reference signal $RS_{RN}$ present in the sixth symbol. This data allows the UE to perform CQI measurements for the UE to RN link on the basis of the information in the reference signals $RS_{RN}$. Using the DL frequency for transmission from Relay node to eNodeB and inclusion of the RS for the relay node allows for channel quality estimation of the relay link even when the relay node is not transmitting to the UE in the DL frequency band A. Introducing the RS for the donor eNodeB and the RS for the RN in the MBSFN sub-frame allows for accurate estimation of both donor eNodeB link and relay link in a backward compatible manner as the MBSFN sub-frames are ignored by Rel-8 UEs (but are interpreted by LTE-Advanced UEs).

Also, in the second time period TIME 2 a normal sub-frame (Freq A $RS_{eNB}$) 106, having the structure shown in FIG. 9 ($S_N$), is transmitted from the eNodeB to the UE on the DL frequency band A. This sub-frame has the structure as shown in FIG. 9 and includes reference signals $RS_{eNB}$ for the eNodeB antenna ports in equally spaced subcarriers within the first, second and fifth (third from-last) OFDM symbol of each slot. The reference signals in the normal sub-frame provide information about the channel link quality with the eNodeB. The UE is able to perform CQI measurements on the basis of the information in the reference signals $RS_{eNB}$.

Additionally, in the second time period TIME 2 a normal sub-frame (Freq B) 108 is transmitted from the UE to the RN on the UL frequency band B. This is possible with the frequency arrangement in this embodiment as the Relay cannot transmit to eNodeB and receive from UE simultaneously in the same frequency band.

Further, in the second time period TIME 2 a normal sub-frame (Freq B) 110 is transmitted from the UE to the eNodeB on the UL frequency band B.

Figure 10C:
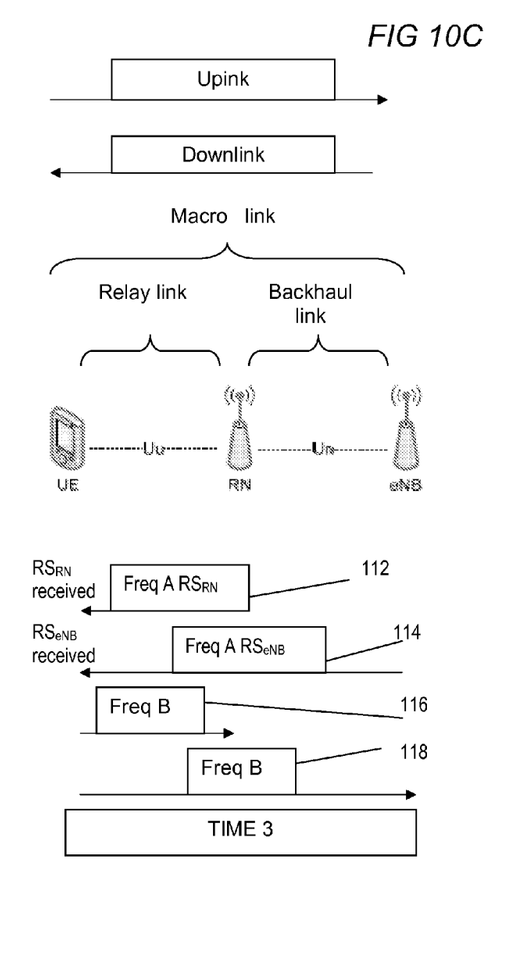

As shown in FIG. 10C, in the third time period TIME 3 a normal sub-frame (Freq A $RS_{RN}$) 1112 is transmitted from the RN on the DL frequency band A. The UE 1 (whether it is an LTE Rel-8 UE or an LTE-Advanced UE) receives the data present in the first, second, third, fourth, fifth, sixth and seventh symbol. If the UE is an LTE-Advanced UE, the UE is adapted to process the RS data present in the sixth symbol. This data allows the UE to perform CQI measurements for the UE to RN link on the basis of the information in the reference signals $RS_{RN}$. If the UE is a Rel-8 UE, it cannot process the RS data present in the sixth symbol, and therefore ignores it.

Also, in the third time period TIME 3 a normal sub-frame (Freq A $RS_{eNB}$) 114 is transmitted from the eNodeB to the UE on the DL frequency band A. This sub-frame has the structure as shown in FIG. 7 and includes reference signals $RS_{eNB}$ for the eNodeB antenna ports in equally spaced subcarriers within the first, second and fifth (third from-last) OFDM symbol of each slot. The reference signals in the normal sub-frame provide information about the channel link quality with the eNodeB. The UE is able to perform CQI measurements on the basis of the information in the reference signals $RS_{eNB}$.

Additionally, in the third time period TIME 3 a normal sub-frame (Freq B) 116 is transmitted from the UE 1 to the RN on the UL frequency band B.

Further, in the third time period TIME 3 a normal sub-frame (Freq B) 118 is transmitted from the UE 1 to the eNodeB 5 on the UL frequency band B.

Figure 10D:
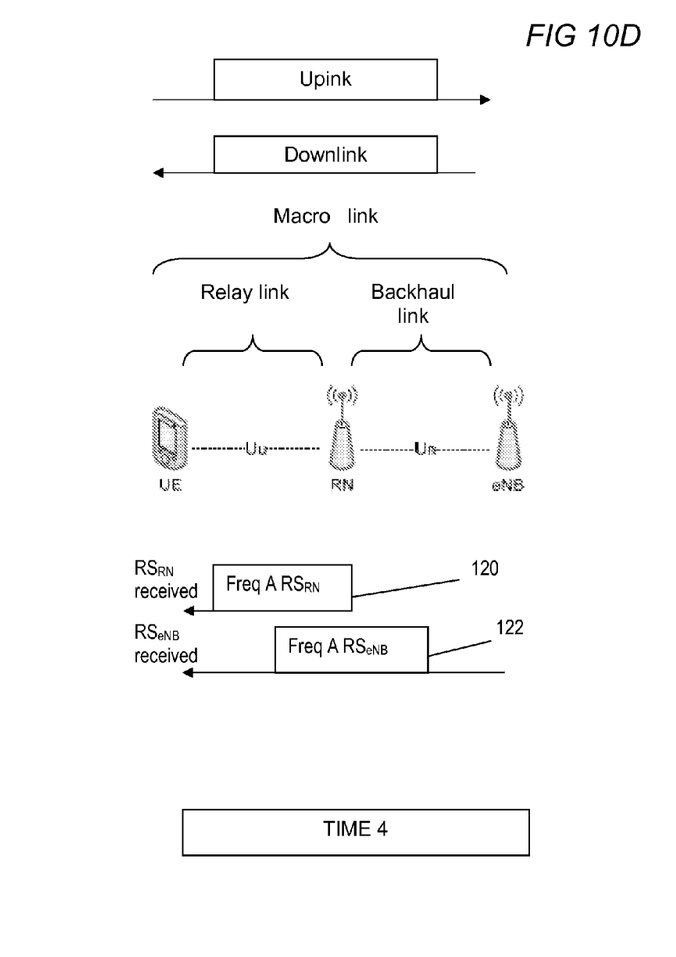

As shown in FIG. 10D, in the fourth time period TIME 4 a normal sub-frame (Freq A $RS_{RN}$) 120 is transmitted from the RN on the DL frequency band A. The UE 1 (whether it is an LTE Rel-8 UE or an LTE-Advanced UE) receives the data present in the first, second, third, fourth, fifth, sixth and seventh symbol. If the UE is an LTE-Advanced UE, the UE is adapted to process the $RS_{RN}$ present in the sixth symbol. This data allows the UE 1 to perform CQI measurements for the UE to RN link on the basis of the information in the reference signals $RS_{RN}$. If the UE is a Rel-8 UE, it cannot process the RS data present in the sixth symbol, and therefore ignores it.

Also, in the fourth time period TIME 4 a normal sub-frame (Freq A $RS_{eNB}$) 122 is transmitted from the eNodeB to the UE on the DL frequency band A. This sub-frame has the structure as shown in FIG. 7 and includes reference signals $RS_{eNB}$ for the eNodeB antenna ports in equally spaced subcarriers within the first, second and fifth (third from-last) OFDM symbol of each slot. The reference signals in the normal sub-frame provide information about the link quality with the eNodeB. The UE is able to perform CQI measurements on the basis of the information in the reference signals $RS_{eNB}$.

For the relay types where the relay is not part of the donor cell (Type 1 relays), the cell specific RS for the donor cell are included in addition to the RS of the relay cell. RS of the relay cell are placed such that they are not in the same location as that of donor cell (Frequency division multiplexed) alternatively providing an orthogonal cover (Code division multiplexing). An advantage is that the Rel-8 UEs will then be able to operate in the donor cell as the RS for channel estimation is available from both donor cell and relay cell. Disadvantages for this type of relays are that the Rel-8 UE may not be able to operate in relay cell as they will not be able to decode the relay RS in the new location. Also the additional relay RS (in case of FDM) creates overhead in the relay-UE link. However, this arrangement is especially useful for relay nodes that can dynamically switched between Type 1 and type 2 operation as the RS is available for both donor and relay nodes.

Figure 11:
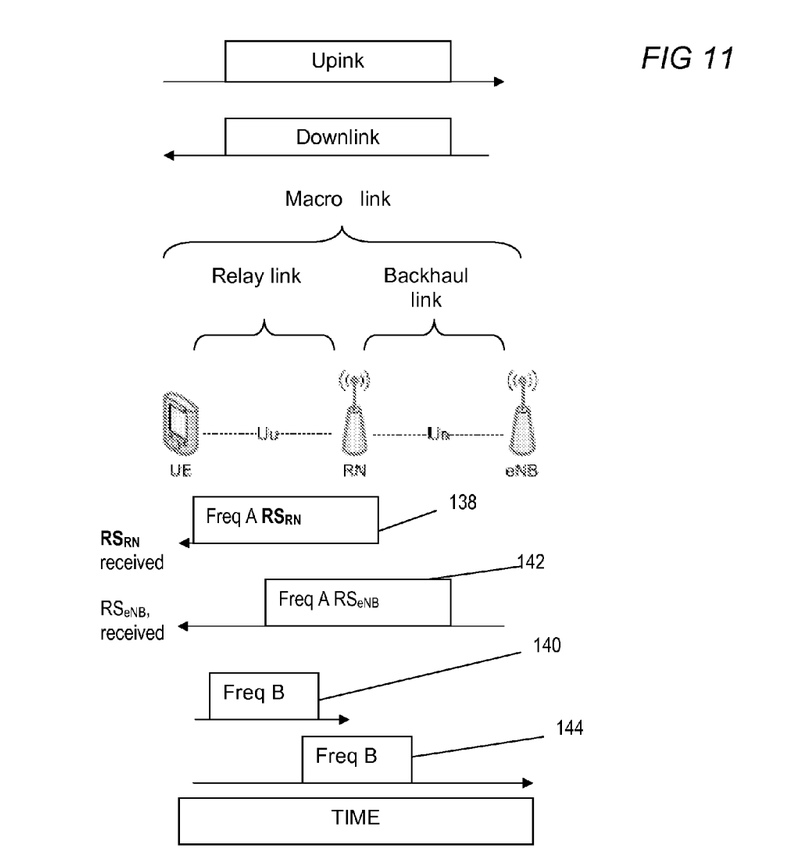
FIG. 11 shows a time period of data transmission for a type 2 relay in accordance with an embodiment of the system described herein.

FIG. 11 shows a time period for a type 2 relay in accordance with an embodiment of the system described herein.

As shown in FIG. 11, in every time period TIME a normal sub-frame (Freq A $RS_{RN}$) 138 is transmitted from the RN to the UE on the DL frequency band A. This sub-frame includes reference signals $RS_{RN}$ for the relay transmitted on equally spaced subcarriers within the sixth (second from-last) OFDM symbol of each slot of the sub-frame. These reference signals provide information about the link quality with the RN. Additionally, in this sub-frame (Freq A $RS_{eNB}$,) 142 is transmitted from the eNodeB to the UE on the DL frequency band A. This includes reference signals $RS_{eNB}$ for the eNodeB antenna ports in equally spaced subcarriers within the first, second and fifth OFDM symbol of each slot. The reference signals in the sub-frame provide information about the link quality with the eNodeB. As this sub-frame also includes reference signals $RS_{RN}$ for the relay transmitted on equally spaced subcarriers within the sixth (second from-last) OFDM symbol of each slot of the sub-frame, the UE receives the sub-frame with the superimposed symbols from the eNodeB and the RN. The subframe received by the UE will therefore be of the form of subframe $S_N$ in FIG. 9. As the location of $RS_{eNB}$ and $RS_{RN}$ are not overlapping, with energy combining, the UE will be able to decode both $RS_{eNB}$ and $RS_{RN}$.

Also, in every time period TIME a normal sub-frame (Freq B) 140 is transmitted from the RN to the eNodeB on the UL frequency band B.

Further, in every time period TIME a normal sub-frame (Freq B) 144 is transmitted from the UE to the eNodeB on the UL frequency band B.

For the relay types where the relay is part of the donor cell (Type 2 Relays), it is therefore proposed that the same cell specific RS as sent on the relay link should be sent on both the backhaul and the relay link and the UE will listen to both backhaul and relay link. Here, an advantage is that Rel-8 LTE UE's will be able to operate in both donor and new relay cell with no degradation in channel estimation.

A Rel-8 UE does not need to know when there is a transmission and when there is no transmission. It can use all the sub-frames for channel estimation and mobility purpose as it receives the same RS either from the relay station or the donor cell. Especially for smaller bandwidth where only wideband CQI is supported the UE will be accurately measure the channel quality irrespective of it is in the relay or the donor cell.

In the examples described above, the reference signals for the antenna ports and the relay node are transmitted by Frequency Division Multiplexing (FDM). Alternatively, the reference signals for the antenna ports and the relay node may be transmitted by Code Division Multiplexing (CDM)

In the embodiments described two frequency bands are available. The system described herein also provides advantages when a single frequency band is available.

The headings in this description shall have no effect as the meaning to be given to any part of the description.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of operating a mobile telecommunications network including a plurality of nodes and a network core, wherein a plurality of mobile telecommunications devices, including first-type mobile telecommunications devices of a first type and second-type mobile telecommunications devices of a second type, are registered with the mobile telecommunications network and communicate with the network core via the nodes, wherein at least one relay is provided between at least one particular node of said plurality of nodes and at least one particular first-type telecommunications device of said plurality of mobile telecommunications devices to extend the radio coverage provided by the said particular node, wherein the at least one relay is not able to link with the second-type mobile telecommunications devices, the method comprising:

transmitting channel quality measurement data to said particular first-type telecommunications device in a link with the relay to enable the particular first-type telecommunications device to calculate the channel quality for the following:
(i) between the particular first-type telecommunications device and the relay; and
(ii) between the particular first-type telecommunications device and the particular node; and making the channel quality measurement data available, via the relay, to only the first-type mobile telecommunications devices of the plurality of mobile telecommunications devices by transmitting the channel quality measurement data in at least one data frame having a first frame format that the second-type mobile telecommunications devices ignore, wherein the channel quality measurement data are transmitted in a predetermined part of the at least one data frame, and wherein the channel quality measurement data in the first frame format includes a first portion which enables the particular first-type telecommunications device to calculate the channel quality between the particular first-type telecommunications device and the relay, and a second portion which enables the particular first-type telecommunications device to calculate the channel quality between the particular first-type telecommunications device and the particular node, the first and second portions being in different predetermined parts of the data frame, and wherein, by virtue of positions of the first portion and the second portion in the redetermined parts of the data frame, the particular first-type telecommunications device is able to use the first portion or the second portion to calculate the channel quality.

2. The method of claim 1, wherein the predetermined part of the at least one data frame is a predetermined time and frequency.

3. The method of claim 1, wherein, during transmission of the at least one data frame in the first frame format, data are transmitted by the relay that enables the particular first-type telecommunications device to calculate the channel quality between the particular first-type telecommunications device and the relay, and data are transmitted by the particular node that enable the particular first-type telecommunications device to calculate the channel quality between the particular first-type telecommunications device and the particular node.

4. The method of claim 1, further comprising:
making the channel quality measurement data available to at least one of the second-type of mobile telecommunications devices by transmitting the channel quality measurement data in at least one data frame having a second frame format that the at least one of the second-type mobile telecommunications devices can receive, such that the at least one data frame in the first frame format and the at least one data frame in the second frame format are transmitted in a same time period.

5. The method of claim 1, wherein the first frame format is that of an LTE MBSFN sub-frame.

6. The method of claim 1, wherein the at least one data frame is transmitted in a frequency band usually reserved for transmissions from the particular node or relay to the first-type mobile telecommunications devices.

7. A mobile telecommunications network, comprising:
a plurality of nodes;
a network core;
a plurality of mobile telecommunications devices registerable with the mobile telecommunications network and that communicate with the network core via the nodes, wherein the plurality of mobile telecommunications devices include first-type mobile telecommunications devices of a first type and second-type mobile telecommunications devices of a second type;
at least one relay to extend the radio coverage provided by at least one particular node of said plurality of nodes, wherein the at least one relay is not able to link with the second-type mobile telecommunications devices; and
a transmission device that transmits channel quality measurement data to at least one particular first-type telecommunications device of said plurality of mobile telecommunications devices in a link with the relay to enable the particular first-type telecommunications device to calculate the channel quality for the following:
  (i) between the particular first-type telecommunications device and the relay; and
  (ii) between the particular first-type telecommunications device and the particular node, wherein the transmission device makes the channel quality measurement data available, via the relay, to only the first-type mobile telecommunications devices of the plurality of mobile telecommunications devices by transmitting the channel quality measurement data in at least one data frame having a first frame format that the second-type mobile telecommunications devices ignore, wherein the channel quality measurement data are transmitted in a predetermined art of the at least one data frame, and wherein the channel quality measurement data in the first frame format includes a first portion which enables the particular first-type telecommunications device to calculate the channel quality between the particular first-type telecommunications device and the relay, and a second portion which enables the particular first-type telecommunications device to calculate the channel quality between the particular first-type telecommunications device and the particular node the first and second portions being in different predetermined parts of the data frame, and wherein, by virtue of positions of the first portion and the second portion in the predetermined parts of the data frame, the particular first-type telecommunications device is able to use the first portion or the second portion to calculate the channel quality.

8. The network of claim 7, wherein the predetermined part of the at least one data frame is a predetermined time and frequency.

9. The network of claim 7, wherein the transmission device includes a component of the particular first-type telecommunications device and a component of the relay, the components being operable such that, during transmission of the at least one data frame, data are transmitted by the relay that enables the particular first-type telecommunications device to calculate the channel quality between the particular first-type telecommunications device and the relay, and data are transmitted by the particular node that enable the particular first-type telecommunications device to calculate the channel quality between the particular first-type telecommunications device and the particular node.

10. The network of claim 7, wherein the transmission device is operable to make the channel quality measurement data available to at least one of the second-type of mobile telecommunications devices by transmitting the channel quality measurement data in at least one data frame having a second frame format that the at least one of the second-type mobile telecommunications devices can receive, such that the at least one data frame in the first frame format and the at least one data frame in the second frame format are transmitted in a same time period.

11. The network of claim 7, wherein the first frame format is that of an LTE MBSFN sub-frame.

12. The network of claim 7, wherein the transmission device is operable to transmit the at least one data frame in a frequency band usually reserved for transmissions from the particular node or the relay to the first-type mobile telecommunications devices.

* * * * *